Oct. 7, 1941.  P. W. VALENTINE  2,257,826
SHOE SOLE TRIMMING MACHINE
Filed Jan. 17, 1940
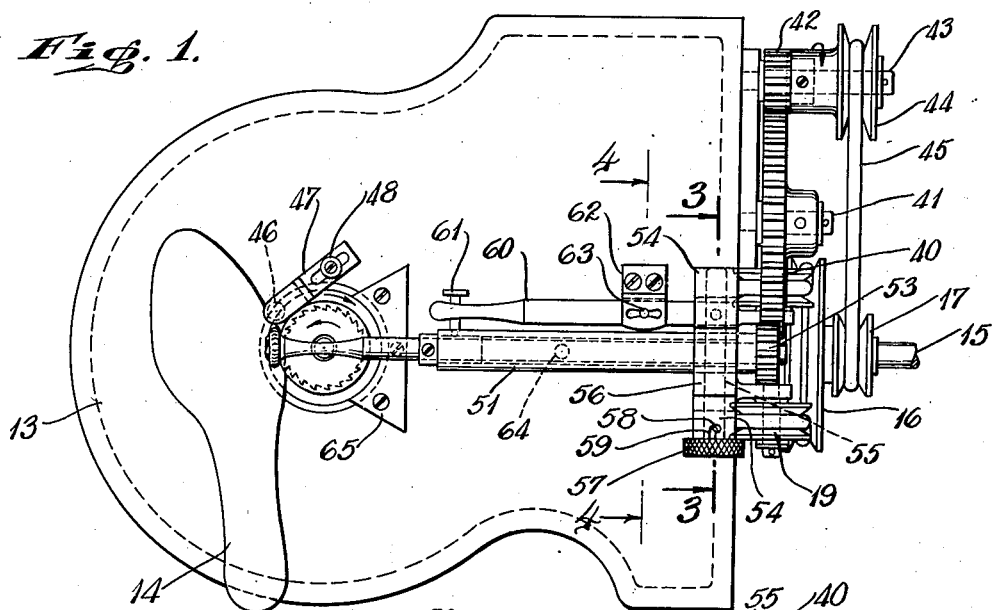
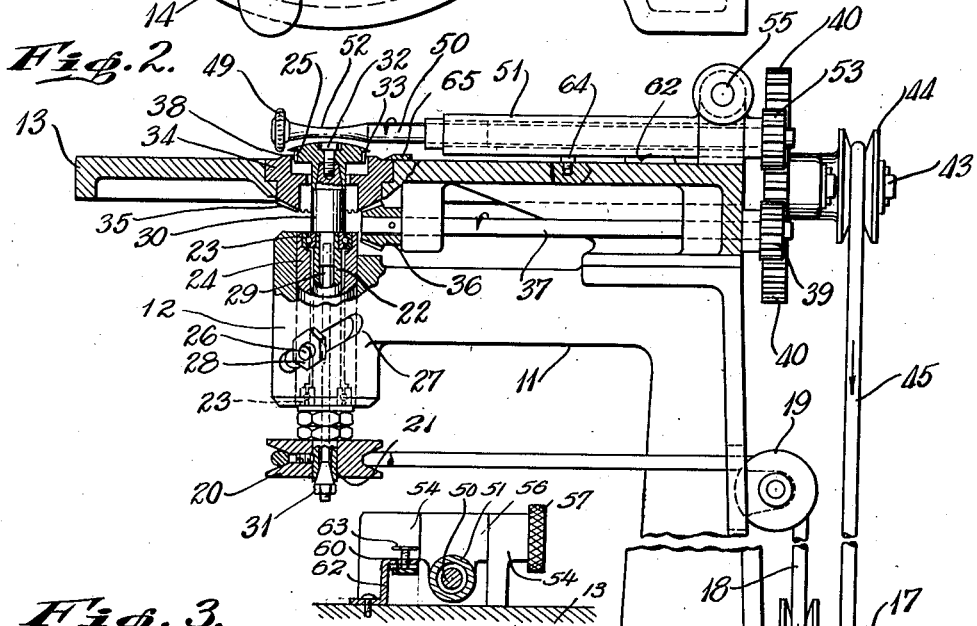
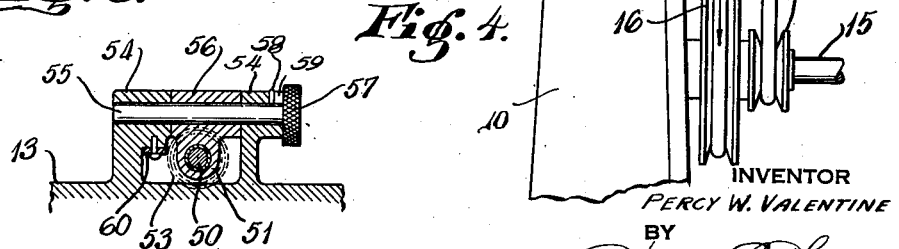
INVENTOR
PERCY W. VALENTINE
BY
Howard E. Thompson
ATTORNEY Patented Oct. 7, 1941

2,257,826

UNITED STATES PATENT OFFICE 2,257,826

SHOE SOLE TRIMMING MACHINE

Percy W. Valentine, Brooklyn, N. Y.

Application January 17, 1940, Serial No. 314,252

11 Claims. (Cl. 12—88)

This invention relates to trimming machines for trimming the edges of workpieces of various kinds and classes, such for example as the trimming of the peripheral edge of the sole of a shoe in the process of manufacturing shoes; and the object of the invention is to provide a machine of the class described having means for feeding and guiding a workpiece through the machine adjacent a cutting tool rotated at high speed, whereby the trimming of the workpiece will be automatic; a further object being to provide means for adjusting the cutting tool to compensate for workpieces of different thicknesses; a still further object being to provide a machine of the character described which is simple and economical in construction and which is so constructed as to adapt the same for use in trimming workpieces of many types and kinds, and still further wherein means is provided for quickly attaching and detaching cutter blades for the replacement thereof or for the substitution of blades or other members adapting the same to different workpieces; and with these and other objects in view, the invention consists in a machine of the class and for the purpose specified, which is constructed as more fully hereinafter described and claimed.

The invention is fully disclosed in the following specification, of which the accompanying drawing forms a part, in which the separate parts of my improvement are designated by suitable reference characters in each of the views, and in which:

Fig. 1 is a plan view of a machine made according to my invention.

Fig. 2 is a side and sectional view of the machine with part of the construction broken away.

Fig. 3 is a section substantially on the line 3—3 of Fig. 1, and,

Fig. 4 is a section substantially on the line 4—4 of Fig. 1.

In the manufacture of shoes and particularly in the preparation of the soles, considerable expense is involved in the trimming of shoe soles which is controlled and guided more or less by hand and involves the work of skilled labor. My improved machine is designed to materially reduce the cost of trimming the soles of footwear by performing this operation substantially automatically and at a much higher rate of speed, thereby materially increasing the daily production of soles, while at the same time performing a trimming operation in a more accurate and finished manner.

While the machine is shown and described as dealing with the trimming of shoe soles, this is simply for the purpose of illustrating one adaptation and use of the invention, it being understood that various types and kinds of leather goods may be trimmed with my improved machine. The machine is especially adaptable for use in trimming workpieces which are of irregular contour.

In the drawing, 10 represents the frame of the machine which is provided at its upper end with a laterally extending arm 11 terminating in a cylindrical bearing 12. Arranged at the top of the frame is a large supporting table 13 over which workpieces, such as soles 14, note Fig. 1, are adapted to pass. Arranged in the frame 10 is a motor or other driven shaft 15 upon which are arranged pulleys 16 and 17. Passed around the pulley 16 is a drive belt 18 which extends over two pulleys 19 and then around a pulley 20 secured on the lower end of a cutter tool operating spindle 21.

The spindle construction 21 is in the form of a sleeve 22 rotating in ball bearings 23 supported in the upper and lower ends of a bushing 24 arranged in the cylindrical bearing 12. The bushing 24 is adjustable vertically in the bearing 12 to raise and lower the position of a cutting or trimming tool 25 by the movement of a radial pin or bolt 26 and an angular or cam slot 27 formed in the bearing 12. The bushing is clamped in position by a nut 28 arranged upon the bolt 26.

Extending through the tubular spindle 21 is a rod 29 which engages a tool coupling stud 30 with the spindle 21. The lower end of the rod has a nut 31 seating in the sleeve 22 to draw the stud 30 downwardly into firm engagement with the spindle as will be apparent. This construction also provides for the detachment of the stud 30 including the tool 25, whenever desired. In fact, the tool 25 is detachable with respect to the stud 30 by a screw 32 as clearly seen in Fig. 2 of the drawing. The tool 25 has cutter teeth spaced circumferentially of the periphery thereof and beneath an upper flange portion 33 of the tool. The flange 33 serves to rest upon the upper surface of the sole 14, or other workpiece, in the rotation of the cutter blade 25 with respect to the periphery of the sole. It will of course be understood that the blade 25 is rotated at high speed while the sole is fed through the machine at a relatively slow speed through the driving and feeding means later described.

Rotatable in the table 13 is a workpiece supporting and feed disc or sleeve 34 which may be supported in suitable bearings in accordance with common practices. On the lower surface of the sleeve 34 are formed beveled gear teeth 35 to be engaged by a beveled pinion 36 arranged upon a shaft 37. The upper surface of the sleeve 34 is slightly raised as seen at 38 adjacent the cutter 25. This raised portion may be roughened as desired to engage the workpiece, but in normal procedure and in operating upon most workpieces, such for example as shoe soles, a smooth or relatively smooth surface may be employed.

The shaft 37 is arranged in suitable bearings upon the undersurface of the table 13, and this shaft extends through one side of the machine and has a gear 39 thereon. The gear 39 meshes with a larger gear 40 arranged upon a stub shaft 41. The gear 40 meshes with another gear 42 on a driven shaft 43, the latter shaft having a pulley 44 around which is passed a drive belt 45 which also passes around the pulley 17 on the drive shaft 15. With this construction it will be understood that in the rotation of the drive shaft the disc or sleeve 34 will be rotated slowly to aid in feeding the workpiece through the machine and over the surface of the cutting or trimming tool 25.

Adjustably supported on the table 13 of the machine is a guide roller 46 supported in an adjustable bracket 47 having an elongated aperture through which passes a clamp screw 48 for retaining the bracket in different positions of adjustment. The roller 46 serves to guide the workpiece 14 through the machine and is adjustable into different positions to suit workpieces of different peripheral contour.

Arranged directly over the rotating sleeve or disc 34 adjacent the periphery of the cutter or trimming tool 25, is a workpiece feed wheel 49 having a roughened peripheral surface to insure firm engagement with the workpiece. This feed wheel serves to feed the workpiece with respect to the periphery of the cutter tool 25 which is rotated in a direction opposite to or against the direction of feed of the workpiece through the machine. The combination of the rotary feed wheel 49 and the rotating workpiece supporting disc or sleeve 34 serves to urge and hold the workpiece in engagement with the cutter to provide what may be termed an automatic feed of the workpiece through the machine. On the other hand, the guide roller 46 serves to counteract the feed movement of the workpiece in moving the same or the trimmed portion thereof away from the feed elements 34 and 49.

The wheel 49 is supported upon a shaft 50 mounted in suitable bearings in an arm 51. The shaft 50 is reduced as seen at 52 to clear the dome-shaped head of the cutter 25 as clearly seen in Fig. 2 of the drawing, so as to minimize the diameter of the wheel 49 and to keep the axis of rotation of this wheel as close to the surface of the sleeve 34 as possible. The shaft 50 extends through the other end of the arm and has a gear 53 arranged thereon to mesh with the large gear 40 so as to be driven through the same drive which is provided for the sleeve 34.

Arranged upon the upper surface of the table are bearings 54 for a pivot pin 55 which passes through a bearing 56 on the arm 51. The pin 55 has an enlarged milled head 57 at one end thereof and a key pin 58 operating in a bayonet slot 59 formed in one of the bearings 54 to provide quick detachment of the pin 55 for the removal of the arm 51 whenever desired, and particularly in replacing the tool 25. Supported at one side of the arm 51 is a flat spring 60 which is secured at one end to one of the bearings 54, the other end resting upon a headed pin 61 extending laterally from the arm 51. At 62 is shown a bracket supporting an adjustment screw 63 for depressing the spring 60 to increase the tensional engagement of the feed wheel 49 with the upper surface of the workpiece 14.

At 64 is shown an adjustable stop screw arranged in the table 13 beneath the arm 51 to limit downward movement of the wheel 49 in the direction of the workpiece. The resilient support of the wheel in engagement with the workpiece will compensate for any slight irregularities which may occur in the workpiece, while at the same time providing the desired tensional engagement with the workpiece, and further compensating for slight variations in workpiece thicknesses, consistent with the vertical adjustment provided for the cutter 25, as previously described. In other words, in operating upon workpieces in the form of shoe soles, the thicknesses of these workpieces vary in the manufacture of different types, kinds and grades of shoes, and this adjustment through vertical movement of the arm 51 will not be such as to affect the drive between the gears 40 and 53 in that the gear 53 is located closely adjacent the pivot pin 55 on which the arm 51 swings. Furthermore the swinging movement of the arm 51 moves the gear 53 over the periphery of the gear 40 rather than in a direction radial with respect thereto.

In the present construction a yoke-shaped retaining plate 65 is secured to the table 13 to overlie part of the upper surface of the rotating sleeve 34 at a point opposite the engagement of the workpiece therewith to retain the sleeve 34 against displacement in the table. The yoke 65 is also disposed directly above the engagement of the beveled pinion 36 with the sleeve 34. However, any other type of mounting may be provided, the only thing which is desirable being to provide a workpiece support and feeding member which is substantially in alinement with the upper surface of the table employed or protruding slightly thereabove to provide a more or less automatic feed of the workpiece over the table or of the workpiece into operative position.

It will be understood that the tubular spindle 22 is retained against movement in the bushing 24 so that in the adjustment of the bushing in the bearing 12, the sleeve 22 together with the pulley 20, the stud 30 and cutter 25, will be adjusted as a complete unit. It will also be apparent that different types of cutters 25 may be employed in operating upon different types and kinds of workpieces. Furthermore, the machine may have other types of tools substituted for the cutter 25 for performing other operations upon a workpiece. For example, burnishing tools may be employed. As a matter of fact, the member 25 may be said to be a shaping, forming, finishing or dressing tool. In referring to cutting or finishing tools, it will also be apparent that reference is made to various types of dressing wheels which may be used for trimming, polishing or otherwise finishing the edges of workpieces automatically fed through the machine.

It will be apparent that one of the distinctive features of the machine consists in the arrangement of the workpiece feeding members one with respect to the other. That is to say, the rotation of the sleeve 34, which may be termed a ring or disc, upon a vertical axis so as to move the workpiece in the direction of the cutter or other member 25, and in arranging the feed wheel 49 upon a horizontal axis and over said revolving feed ring at a point adjacent the periphery of the member 25, and still further in rotating the member 25 in a direction opposite to the rotation of the ring 34 and preferably at a relatively high speed in comparison with the rotation of the ring 34.

Having fully described my invention, what I claim as new and desire to secure by Letters Patent, is:

1. A machine of the class described comprising a workpiece supporting table, a workpiece support and feed ring rotatably mounted in the table, a workpiece feed wheel rotatable on a horizontal axis and disposed over the surface of said ring, means for rotating said ring and wheel, a member arranged within peripheral boundaries of and coaxially with said ring to engage the peripheral edge of a workpiece at the position thereof disposed between said ring and wheel in performing a predetermined operation upon said edge of the workpiece, and means for rotating said member.

2. A machine of the class described comprising a workpiece supporting table, a workpiece support and feed ring rotatably mounted in the table, a workpiece feed wheel rotatable on a horizontal axis and disposed over the surface of said ring, means for rotating said ring and wheel, a member arranged within peripheral boundaries of said ring to engage the peripheral edge of a workpiece fed through the machine by said ring and wheel in performing a predetermined operation upon said edge of the workpiece, and means for rotating said member in a direction opposite to the direction of rotation of said ring.

3. A machine of the class described comprising a workpiece supporting table, a workpiece support and feed ring rotatably mounted in the table, a workpiece feed wheel rotatable on a horizontal axis and disposed over the surface of said ring, means for rotating said ring and wheel, a member arranged within peripheral boundaries of and coaxially with said ring to engage the peripheral edge of a workpiece fed through the machine by said ring and wheel in performing a predetermined operation upon said edge of the workpiece, means for rotating said member, means adjustably supporting said member vertically with respect to the surface of said ring to compensate for workpieces of different thicknesses, a pivoted arm forming the support for the axis of said feed wheel, said pivot arm extending over said ring and member in alinement with the common axis thereof, said wheel being at the extremity of said arm and cooperating with a portion of said ring remote from the pivot of said arm, and yieldable means holding the wheel in engagement with the workpiece.

4. A machine of the class described comprising a workpiece supporting table, a workpiece support and feed ring rotatably mounted in the table, a workpiece feed wheel rotatable on a horizontal axis and disposed over the surface of said ring, means for rotating said ring and wheel, a member arranged within peripheral boundaries of and coaxially with said ring to engage the peripheral edge of a workpiece fed through the machine by said ring and wheel in performing a predetermined operation upon said edge of the workpiece, means for rotating said member, means adjustably supporting said member vertically with respect to the surface of said ring to compensate for workpieces of different thicknesses, a pivoted arm forming the support for the axis of said feed wheel, said pivot arm extending over said ring and member in alinement with the common axis thereof, said wheel being at the extremity of said arm and cooperating with a portion of said ring remote from the pivot of said arm, yieldable means holding the wheel in engagement with the workpiece, and adjustable means in said table cooperating with the arm for limiting movement of the wheel by said yielding means in the direction of the workpiece.

5. In a machine for performing predetermined operations upon the peripheral edge of a workpiece, workpiece feeding means comprising a rotatable ring and a feed wheel, said wheel being arranged upon an axis disposed substantially at right angles to the axis of rotation of said ring, means yieldably holding the axis of said wheel to control spacing between the feed wheel and the surface of said ring to compensate for workpieces of different thicknesses, a rotatable member arranged within peripheral boundaries of and coaxially with said ring to engage the peripheral edge of a workpiece fed through the machine by said ring and wheel, means for rotating said member, said member having a flange portion overlying at least one surface of the workpiece, means adjustably supporting said member to compensate for workpieces of different thicknesses, and adjustable means adjacent said feed wheel for guiding the workpiece fed through the machine.

6. A machine for trimming peripheral edges of a workpiece comprising a rotatable cutter member, means for rotating said member, means involving a rotatable ring mounted coaxially with said member and a rotatable wheel cooperating with said ring for feeding a workpiece through the machine, and said ring and wheel being collectively rotatable in a manner to support and urge the peripheral edge of the workpiece in the direction of said cutter member and to feed the workpiece in a direction opposed to the direction of rotation of said member.

7. A machine for trimming peripheral edges of a workpiece comprising a rotatable cutter member, means for rotating said member, means involving a rotatable ring mounted coaxially with said member and a rotatable wheel cooperating with said ring for feeding a workpiece through the machine, and said ring and wheel being collectively rotatable in a manner to support and urge the peripheral edge of the workpiece in the direction of said cutter member and to feed the workpiece in a direction opposed to the direction of rotation of said member, said workpiece feeding means being yieldable to compensate for workpieces of different thicknesses, and said cutter member being adjustable to compensate for workpieces of different thicknesses.

8. A machine of the class described comprising a workpiece supporting table, two shafts arranged substantially parallel to the surface of the table, one shaft being arranged above the table and the other beneath the table, a common drive at one end of said shafts, the upper shaft having at its free end a workpiece feed wheel, a workpiece support and feed ring in the table, means placing the lower shaft in operative engagement with said ring to rotate the ring in the table, said feed wheel being disposed over the surface of said ring at a point on said ring farthest remote from said first named ends of the shafts, means yieldably engaging the upper shaft to control engagement of said wheel with a workpiece disposed between the wheel and the surface of said ring, a member for engaging the periphery of the workpiece fed through the machine by said ring and wheel adjacent the engagement of the feed wheel with said workpiece, said member being arranged beneath the shaft supporting said wheel and other adjustable means for guiding the workpiece through the machine.

9. In a machine of the class described, having a table and a rotatable feed ring mounted in said table a cutter wheel extending through said ring and protruding above said table, an elongated bearing in the machine, a bushing arranged in said bearing, a spindle rotatable in the bushing, means coupling said cutter wheel with one end of the spindle, means at the other end of the spindle in operative engagement with a driving means for rotating said spindle and said cutter wheel, and means adjustably supporting the bushing in said bearing longitudinally of the axis of said spindle to adjust the position of the cutter wheel with respect to the surface of said table.

10. A machine of the class described comprising a workpiece supporting plate, a workpiece feed ring imbedded in the surface of said plate, means for rotating said ring, a member exposed at the surface of said ring within peripheral edges thereof, said member being rotated upon an axis arranged at right angles to the surface of said plate, yieldably held shaft arranged over the surface of said member, plate and ring with the axis of said shaft extending across the axis of said member, said shaft having a workpiece feed wheel, the periphery of which is disposed over the surface of said ring outwardly of the periphery of said member, and said ring and wheel supporting a workpiece with the peripheral edge of the workpiece in firm engagement with said member.

11. A machine of the class described comprising a workpiece supporting plate, a workpiece feed ring imbedded in the surface of said plate, means for rotating said ring, a member exposed at the surface of said ring within peripheral edges thereof, said member being rotated upon an axis arranged at right angles to the surface of said plate, a yieldably held shaft arranged over the surface of said member, plate and ring with the axis of said shaft extending across the axis of said member, said shaft having a workpiece feed wheel, the periphery of which is disposed over the surface of said ring outwardly of the periphery of said member, said ring and wheel supporting a workpiece with the peripheral edge of the workpiece in firm engagement with said member, means operating said ring and feed wheel to move the workpiece in one direction, and means rotating said member to move the periphery thereof in a direction opposite to the feed of said workpiece.

PERCY W. VALENTINE.